US009731657B1

(12) United States Patent
Salter et al.

(10) Patent No.: US 9,731,657 B1
(45) Date of Patent: Aug. 15, 2017

(54) VEHICLE HANGER AND ILLUMINATION ASSEMBLY

(71) Applicant: Ford Global Technologies, LLC, Dearborn, MI (US)

(72) Inventors: Stuart C. Salter, White Lake, MI (US); Pietro Buttolo, Dearborn Heights, MI (US); Christopher Anthony Danowski, Rochester, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/211,370

(22) Filed: Jul. 15, 2016

(51) Int. Cl.
*B60Q 1/00* (2006.01)
*B60Q 1/26* (2006.01)
*B60R 7/10* (2006.01)
*B60R 7/04* (2006.01)
*B60Q 3/02* (2006.01)

(52) U.S. Cl.
CPC .............. *B60R 7/10* (2013.01); *B60Q 3/0223* (2013.01); *B60R 7/043* (2013.01); *B60Q 2500/00* (2013.01)

(58) Field of Classification Search
CPC ...... B60Q 3/20; B60Q 3/233; B60Q 2500/00; B60R 7/043; B60R 7/10
USPC .................................................. 362/488, 490
See application file for complete search history.

(56) References Cited

U.S. PATENT DOCUMENTS 5,791,614 A 8/1998 Sims
6,095,469 A 8/2000 Von Alman

FOREIGN PATENT DOCUMENTS

DE 102011112438 A1 3/2013

*Primary Examiner* — Jason Moon Han
(74) *Attorney, Agent, or Firm* — Vichit Chea; Price Heneveld LLP

(57) ABSTRACT

A vehicle hanger assembly includes a deployable hanger supported by a structure on a vehicle. A first proximity sensor detects a user in close proximity to the hanger, and a second sensor detects deployment of the hanger. A light source is controlled to illuminate the object at a first intensity when the hanger is deployed and arranged to illuminate an object supported on the hanger at a second intensity when the user is detected in close proximity to the hanger.

19 Claims, 5 Drawing Sheets

VEHICLE HANGER AND ILLUMINATION ASSEMBLY

FIELD OF THE INVENTION

The present invention generally relates to vehicle hanger assemblies, and more particularly relates to a vehicle hanger assembly having light illumination.

BACKGROUND OF THE INVENTION

Automotive vehicles are commonly configured with one or more hangers typically configured in the shape of a hook for hanging an article, such as a purse or a coat. The hangers may be fixedly located at various locations such as on a vehicle seat, a floor console, the instrument panel and the headliner and usually have a shape configured to hold an object such the strap of a purse. However, conventional hanger assemblies are often located in dark locations of the vehicle such that the passengers may have difficulty in viewing the hanger and the contents of a purse or other article attached to the hanger. Accordingly, it is desirable to provide for a hanger assembly that offers enhanced viewing.

SUMMARY OF THE INVENTION

According to one aspect of the present invention, a vehicle hanger assembly is provided that includes a hanger supported by a structure on a vehicle. The hanger assembly also includes a first sensor arranged to detect a user in close proximity to the hanger, and a light source arranged to illuminate an object supported on the hanger when the user is detected in close proximity to the hanger.

According to another aspect of the present invention, a vehicle hanger assembly is provided that includes a deployable hanger supported by a structure on a vehicle, a first sensor having a proximity sensor arranged to detect a user in close proximity to the hanger, and a second sensor detecting deployment of the hanger. The hanger assembly further includes a light source controlled to illuminate the object at a first intensity when the hanger is deployed and arranged to illuminate an object supported on the hanger at a second intensity when the user is detected in close proximity to the hanger.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
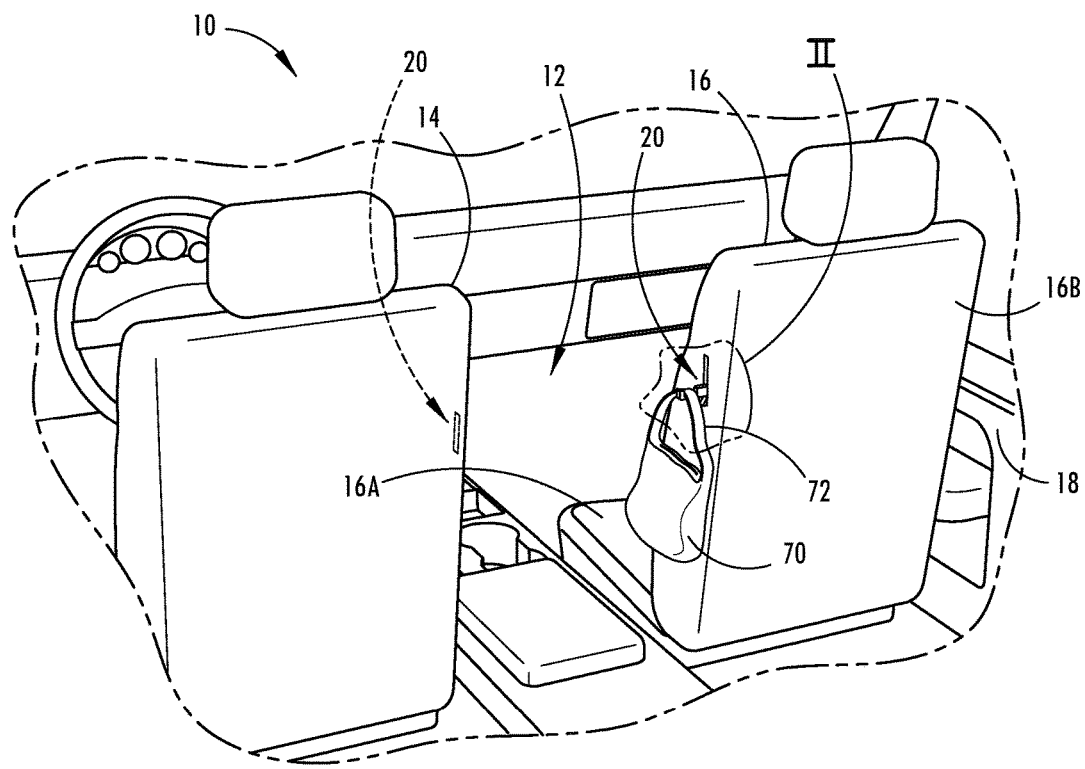
FIG. 1 is a side perspective view of an interior of a vehicle having a hanger assembly provided on a vehicle seat, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the passenger compartment 12 of a vehicle 10 is generally illustrated equipped with one or more vehicle hanger assemblies 20, according to one embodiment. The vehicle 10 may be an automotive wheeled vehicle such as a passenger car, van, truck, bus or other vehicle. The vehicle 10 shown has a driver seat 14 and a passenger seat 16 generally located side by side within the passenger compartment 12 of the vehicle 10 for holding passengers. The vehicle seats, such as the passenger seat 16 include a seat bottom 16A pivotally connected to a seatback 16B. One or more passengers may enter and exit the vehicle 10 by way of one or more doors 18 and may be seated within any of the seats provided within the vehicle 10. It should be appreciated that the vehicle 10 may be equipped with ambient lighting for providing low intensity light illumination within the vehicle 10. Ambient lighting may be turned on and off when a light switch activates the ambient lighting or may be on as all times when the vehicle is keyed on.

A vehicle hanger assembly 20 is shown located on a side portion of the seatback 16B of passenger seat 16. The vehicle hanger assembly 20 is provided at a location that is accessible to one or more of the passengers within the vehicle 10 such that a passenger may hang an article or object, such as a purse 70 on the hanger assembly 20. It should be appreciated that other objects, such as a coat, a workbag, and other items may be supported on and held by the hanger assembly 20. In addition, another similarly configured hanger assembly 20 is shown located on the driver seat 14. It should be appreciated that the vehicle hanger assembly 20 may be located elsewhere on the vehicle 10 such as on the instrument panel, the headliner, one or more side pillars, and at the other locations.

Figure 2:
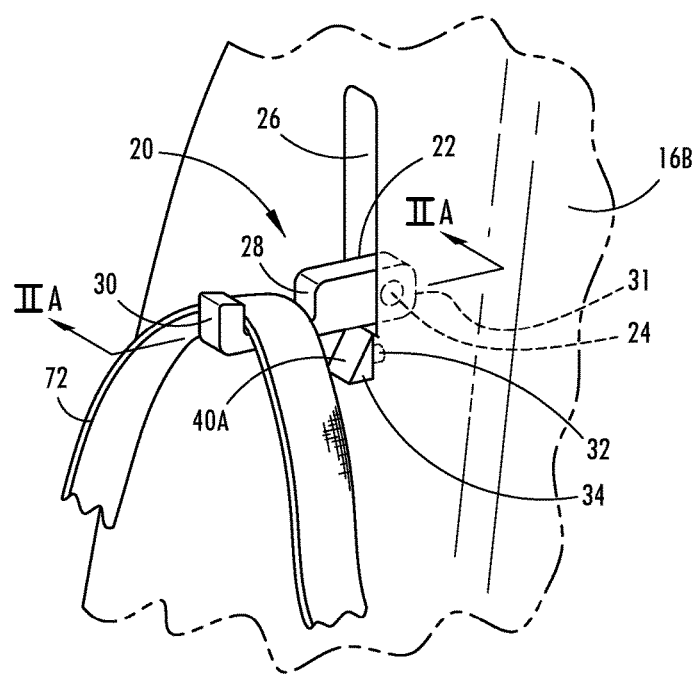
FIG. 2 is an enlarged perspective view of the hanger assembly showing the hanger deployed in a downward use position.
Figure 3:
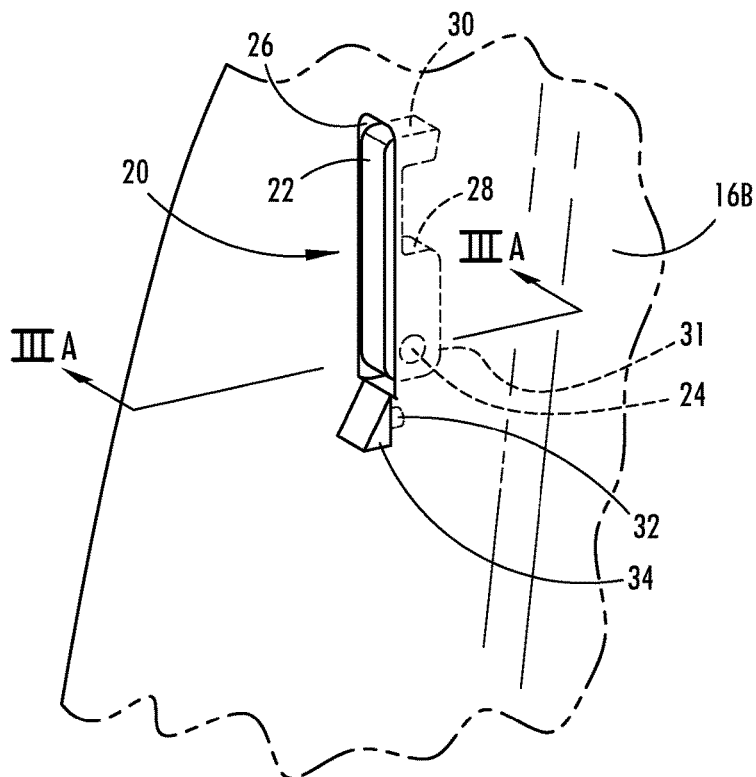
FIG. 3 is a perspective view of the hanger assembly showing the hanger in an upward stored position.
Figure 3A:
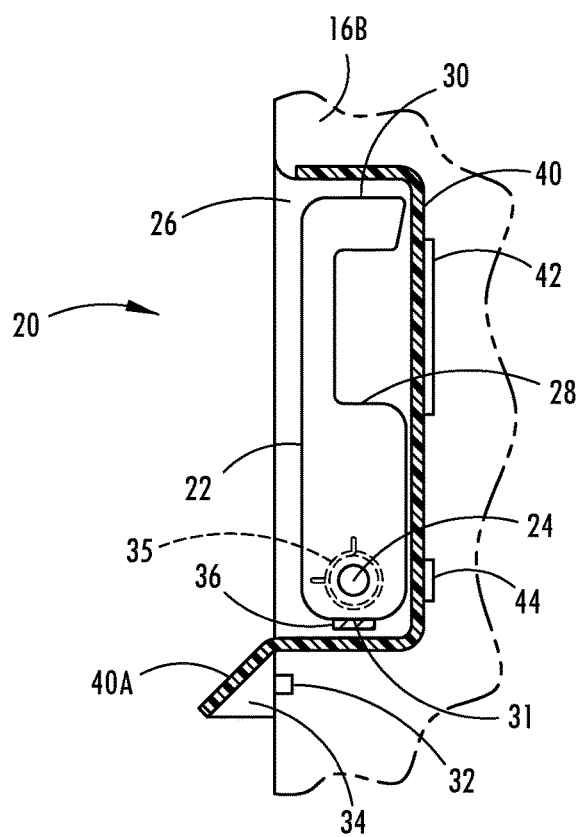
FIG. 3A is a cross-sectional view of the hanger assembly taken through line IIIA-IIIA of FIG. 3.

The vehicle hanger assembly 20 is further illustrated in greater detail in FIGS. 2-3A. In FIG. 2, the vehicle hanger assembly 20 is shown having a pivotable hanger 22 pivotally connected via pivot connection 24 to the seatback 16B such that the hanger 22 may pivot about a horizontal axis between a downward rotated horizontal use position as seen in FIG. 2 and an upward rotated vertical stored position as seen in FIG. 3. The hanger 22 is shown generally configured as a hook generally having a U-shaped or J-shaped portion 28 and an outward protruding terminal member portion 30 opposite the end of the base portion 31. The U-shaped or J-shaped portion 28 provides a catch feature for securely holding an article, such as the strap 72 of a purse 70. The pivoting pin 74 is supported within the seatback 16B of seat 16 in the embodiment shown. The hanger 22 pivots between the outward extending horizontal use position and a vertical stored position in which the hanger 22 is stored within an opening 26 provided in the seatback 16B. As such, the hanger 22 may be stored within an outer wall of the seatback 16 when in a stored position. It should be appreciated that a user may pivot the hanger 22 between the use and stored positions by applying force to the hanger 22. When in the stored position, a user may apply an inward force near the base portion 31 of the hanger 22 below pivoting mechanism 24 or to cause the hanger 22 to pivot outward. The hanger 22 may include a handle feature to enable to user to pull the hanger out from the stored position. It should further be appreciated that the hanger 22 may include a spring 25 such as a coil spring or other bias member to bias the hanger 22 with spring force to the stored position. When the hanger 22 is in the outward extending use position, the weight of the object supported thereon may overcome the bias force of the spring 25 and maintain the hanger 22 in the use position.

Figure 2A:
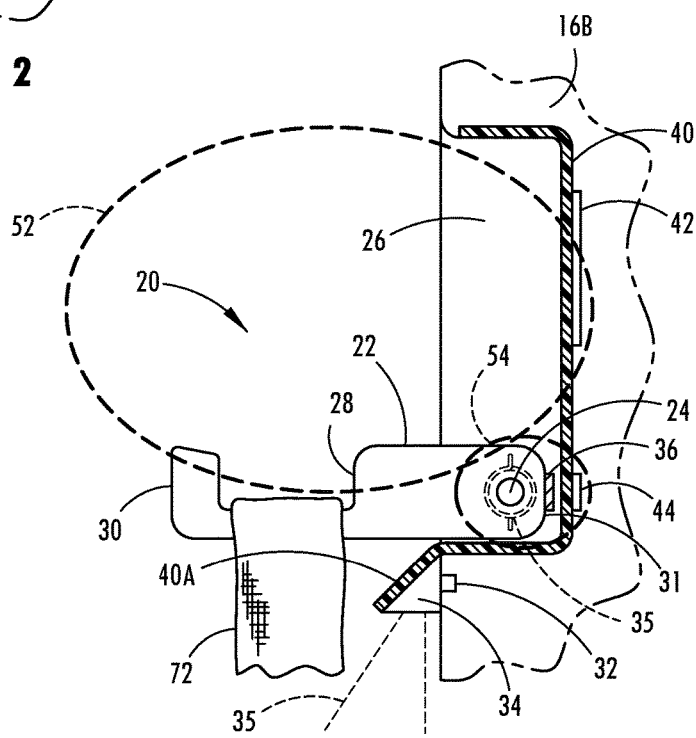
FIG. 2A is a cross-sectional view of the hanger assembly taken through line IIA-IIA of FIG. 2.

With particular reference to FIG. 2A, the vehicle hanger assembly 20 is further illustrated having a supporting substrate structure 40 generally shown formed within the seatback 16B. The substrate 40 generally extends around the opening 26 into which the hanger 22 is stored in the stored position and may be made as a rigid circuit board material. A lower portion 40A of the substrate 40 is shown extending outward from the seatback 16B at a position below the hanger 22. Connected to the lower portion 40A of the substrate 40 is an optic device 34 and a light source 32. According to one embodiment, the light source 32 may be configured as one or light emitting diodes (LED's). The optic device 34 may be a lens or a reflector for directing light output from the light source into a beam pattern 35. The light source 32 and optic device 34 are arranged to provide light illumination projecting into a region below the hanger 22 where an object, such as a purse 70 would be expected to be located when hanging from the hanger assembly 20. The light source 32 and optic device 34 provide a light illumination beam 35 so that a user, such as a passenger of a vehicle 10, may readily view a hanging purse or other article while illuminated with light and may view the contents within the purse or other article suspended from the vehicle hanger assembly 20.

The vehicle hanger assembly 20 includes first and second capacitive proximity sensors that operate as switches to control the light source 32, to generate low ambient lighting and high intensity lighting as described herein. Included is a first proximity sensor 42 shown formed on the backside of the substrate 40 and positioned in close proximity to the hanger 22. The first proximity sensor 42 may be configured as a capacitive sensor generating a capacitive field 52. The first proximity sensor provides a sense capacitive activation field 52 that may sense a user (person) in contact or close proximity to the hanger 22. The sense capacitive activation field 52 of the first proximity sensor 42 is a capacitive field in the exemplary embodiment and the user's finger and hand have electrical conductivity and dielectric properties that cause a change or disturbance in the sense activation capacitive field as should be evident to those skilled in the art. However, it should also be appreciative by those skilled in the art that additional or alternative types of proximity sensors can be used, such as, but not limited to inductive sensors, optical sensors, temperature sensors, resistive sensors, the like, or a combination thereof. The first proximity sensor 42 is arranged to detect a user in close proximity to the hanger 22 such that the light source 32 may be controlled to illuminate an object supported on the hanger when the user is detected in close proximity to the hanger 22. The detection activation field 52 of the first proximity sensor 42 may be sufficiently large to detect the user's hand anywhere within a distance of about 30 mm from the hanger 22, according to one example, and may positioned above the hanger 22 as shown. It should be appreciated that the activation field 52 of first proximity sensor 42 may extend above the hanger 22 and/or below the hanger 22.

The vehicle hanger assembly 20 also has a second proximity sensor 44 shown located on the back surface of substrate 40 and positioned proximate to the base portion 31 of the hanger 22 when the hanger 22 is in the horizontal use position as seen in FIG. 2A. The base portion 31 of hanger 22 has a conductive layer 36 such as a printed conductive ink or metal sheet or foil provided therein. When the hanger 22 is in the horizontal use position as seen in FIG. 2A, the conductive layer 36 on base portion 31 is positioned aligned with and proximate to the second proximity 44. The second proximity sensor 44 may be capacitive sensor that detects the metal layer 36 at a location in close proximity (e.g., within about 3 mm) to the second proximity sensor 44 when the hanger 22 is in the horizontal use position. As such, the second proximity sensor 44 may detect when the hanger 22 is in both the horizontal use position and the vertical stored positions by monitoring the interference to the detection or activation field 54 caused by the conductive layer 36. It should be appreciated that other types of proximity sensors may be employed to detect the use and stored positions of the hanger 22 which may include inductive sensors, optical sensors, resistive sensors, and the like.

Accordingly, the vehicle hanger assembly 20 may be stored within the seatback 16B of seat 16 when not in use as seen in FIG. 3 and FIG. 3A. A user, such as a passenger in the vehicle, may rotate the hanger 22 outward from the stored position to a horizontal use position as seen in FIGS. 2 and 2A. When the hanger 22 moves to the horizontal use position, the conductive layer 36 is located proximate the second proximity sensor 44 which generates a signal that is processed by a controller that turns on the light source 32 at a low intensity light. The low intensity light may be turned on at any time or may be limited to when ambient lighting of the vehicle is available. It should be appreciative that ambient lighting of the vehicle may be turned on the driver activates a switch to turn on the ambient lighting. With the ambient lighting activated, the low light intensity generated by the light source 32 enables passengers in the vehicle to view the area below the vehicle hanger 22 at the location where an object may be supported thereon. When a user interfaces with the vehicle hanger assembly 20 by placing their hand or other body part in close proximity to the hanger 22, the first proximity sensor 42 detects the presence of the user's hand and generates a signal which is processed by the controller which causes the light source 32 to be activated at a high intensity. The high intensity light is directed onto the object such as a purse 70 hanging from the hanger 22. As such, the high intensity light enables passengers in the vehicle 10 to view contents of the purse 70 or other hanging article due to the high intensity lighting and the illumination projecting into the purse 70. The high intensity lighting may be activated for a limited time, such as five seconds as determined by a timer, after which the light source is turned off.

Figure 4:
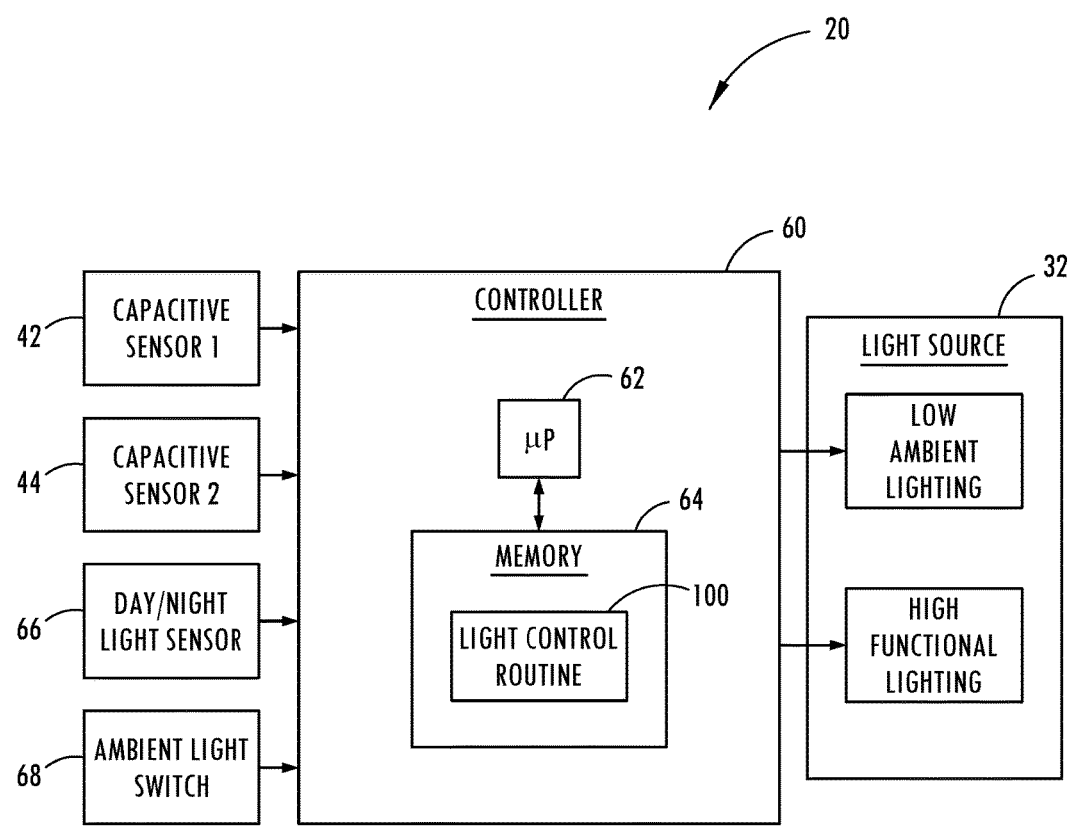
FIG. 4 is a block diagram illustrating the hanger assembly and controls for controlling the light source.

The vehicle hanger assembly 20 is further illustrated in FIG. 4 having a controller 60 which includes a microprocessor 60 and memory 64. Stored within memory 64 is a light control routine 100 which processes various inputs supplied to the controller 60 and controls the light source 32 with an output signals to control the high and low light intensity of the light source 32 as described herein. It should be appreciated that other analog and/or digital control circuitry may be employed to process the inputs and to generate the outputs as described herein. The controller 60 is shown receiving sensed capacitive signals from the capacitive proximity sensors 42 and 44. In addition, the controller 60 receives as an input an output from a day/night light sensor indicative of the dark or nighttime light intensity within the vehicle. Further, the controller receives as an input an output from the ambient light switch 68. The ambient light switch 68 may include automatic controls which activates ambient vehicle lighting and/or may include a manual switch which a driver or other operator of the vehicle may turn on the ambient lighting. The controller 60 processes the various inputs and executes the light control routine 100 to generate control signals to control the light source 32. Particularly, the light source 32 is controlled to generate either low ambient lighting, high functional lighting, or no lighting at all.

Figure 5:
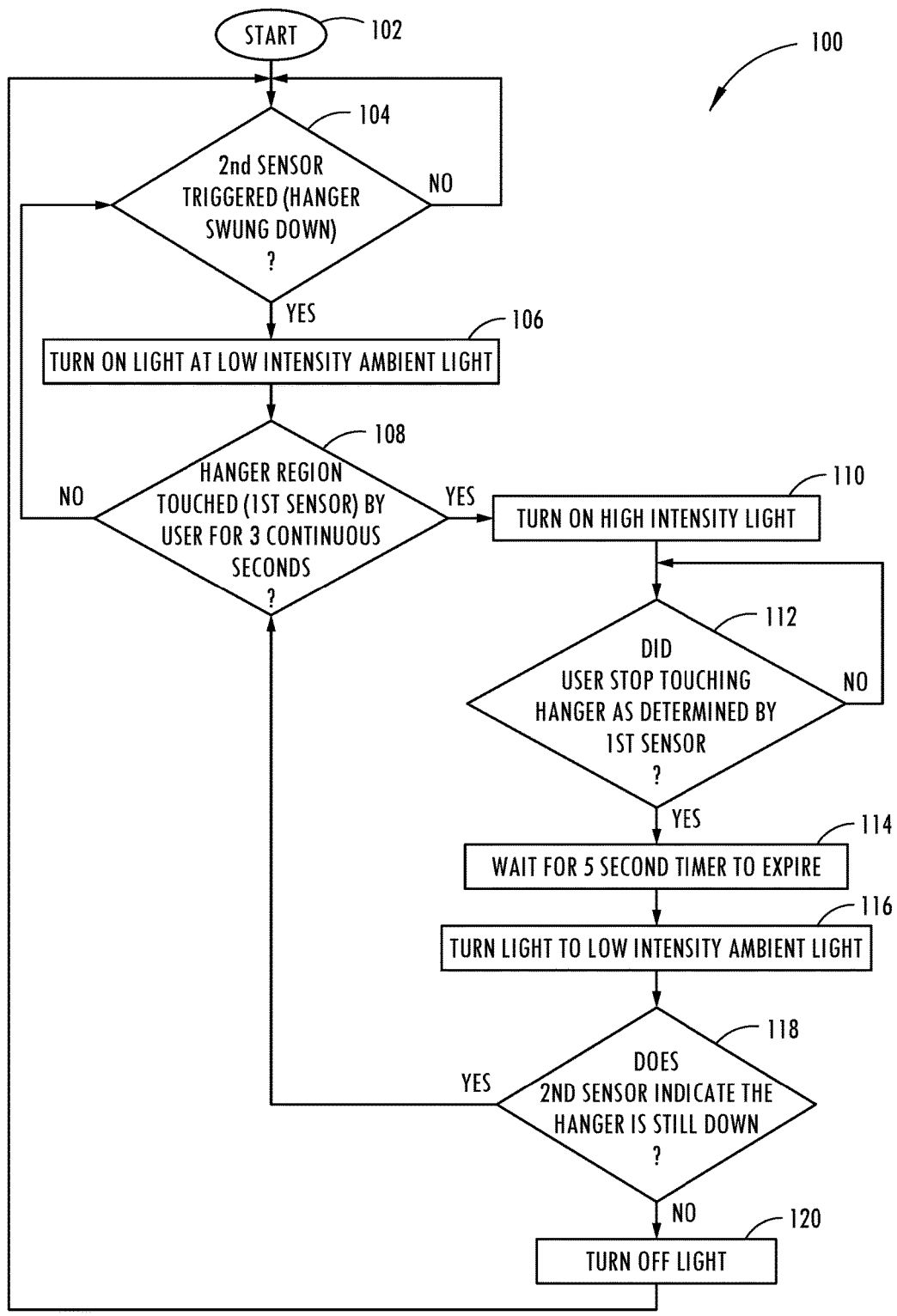
FIG. 5 is a flow diagram illustrating a light control routine for controlling illumination of the hanger assembly, according to one embodiment.

Referring to FIG. 5, the light control routine 100 is illustrated, according to one embodiment. Routine 100 begins at step 102 and proceeds to decision step 104 to determine if the second proximity (capacitive) sensor has been triggered, which occurs when the hanger is swung down to the horizontal use position. If the hanger has not been swung down to the horizontal use position, routine 100 returns to step 104. If the hanger is down in the horizontal use position, routine 100 proceeds to step 106 to turn on the light source at low intensity ambient light at step 106. The low intensity ambient light may be turned on only when the ambient lighting of the vehicle is turned on, according to one embodiment. According to other embodiments, the low intensity ambient light may be generated independent of the vehicle ambient lighting. Next, at decision 108, routine 100 determines if the hanger region detected by the first proximity (capacitive) sensor has been touched or is in close proximity to a user for a time period such as three continuous seconds and, if not returns to step 104. If a user is detected in contact or close proximity to the hanger for the three second time period, routine 100 proceeds to step 110 to turn on the light source on a high intensity. The high intensity light enables one or more passengers in the vehicle to view the object supported by the hanger and contents that may be stored within the object, such as contents within a purse. Next, decision 112, routine 100 determines if the user stopped touching the hanger as determined by the first proximity (capacitive) sensor and, if not, returns to step 112 and waits for the user to stop touching the hanger. Once the user stops touching the hanger, routine 100 proceeds to step 114 to wait for a five second timer to expire and thereafter proceeds to step 116 to turn the light on low intensity ambient lighting. Next, at decision step 118, routine 100 determines if the second proximity (capacitive) sensor indicates that the hanger is still in the downward use position and, if so, returns to decision step 108. If the second proximity (capacitive) sensor indicates that the hanger is not in the use position, routine 100 proceeds to step 120 to turn off the light before returning.

Accordingly, the vehicle hanger assembly 20 advantageously provides for enhanced light illumination of an object supported on the hanger assembly such as a purse and the contents within the purse. In addition, the vehicle hanger assembly 20 further provides for illumination of the hanger to enable a user to locate the hanger and to hang an object, such as a purse on the hanger.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hanger assembly comprising:
a hanger supported by a structure on a vehicle;
a first sensor arranged to detect a user in close proximity to the hanger; and
a light source arranged to illuminate an object supported on the hanger when the user is detected in close proximity to the hanger.

2. The assembly of claim 1, wherein the first sensor comprises a first proximity sensor.

3. The assembly of claim 2, wherein the first proximity sensor comprises a capacitive sensor.

4. The assembly of claim 1, wherein the hanger comprises a rotatable hanger that rotates between a stored position and a use position.

5. The assembly of claim 4 further comprising a second sensor for detecting the hanger rotated to the use position.

6. The assembly of claim 5, wherein the second sensor comprises a second proximity sensor.

7. The assembly of claim 4, wherein the light source generates a low intensity light when the hanger is in the use position and generates a high intensity light when the user is detected in close proximity to the hanger.

8. The assembly of claim 7, wherein the light source is activated only when the ambient vehicle lighting is activated.

9. The assembly of claim 1, wherein the hanger is supported by a vehicle seat.

10. The assembly of claim 1, wherein the light source is turned off after a timer expires.

11. A vehicle hanger assembly comprising:
a deployable hanger supported by a structure on a vehicle;
a first sensor comprising a proximity sensor arranged to detect a user in close proximity to the hanger;
a second sensor detecting deployment of the hanger; and
a light source controlled to illuminate at a first intensity when the hanger is deployed and arranged to illuminate an object supported on the hanger at a second intensity when the user is detected in close proximity to the hanger.

12. The assembly of claim 11, wherein the first sensor comprises a first proximity sensor.

13. The assembly of claim 12, wherein the first proximity sensor comprises a capacitive sensor.

14. The assembly of claim 11, wherein the hanger comprises a rotatable hanger that rotates between a stored position and a use position.

15. The assembly of claim 11, wherein the second sensor comprises a second proximity sensor.

16. The assembly of claim 11, wherein the light source generates a low intensity light when the hanger is in the use position and generates a high intensity light when the user is detected in close proximity to the hanger.

17. The assembly of claim 11, wherein the light source is activated only when the ambient vehicle lighting is activated.

18. The assembly of claim 11, wherein the hanger is supported by a vehicle seat.

19. The assembly of claim 11, wherein the light source is turned off after a timer expires.

* * * * *